United States Patent [19]
Chichester et al.

[11] 3,991,846
[45] Nov. 16, 1976

[54] POWER STEERING SYSTEM

[75] Inventors: Willard L. Chichester; Howard C. Hansen, both of Battle Creek, Mich.

[73] Assignee: Clark Equipment Company, Buchanan, Mich.

[22] Filed: Aug. 7, 1975

[21] Appl. No.: 602,847

[52] U.S. Cl. .................................. 180/132; 60/423; 60/433
[51] Int. Cl.² .......................................... B62D 5/06
[58] Field of Search ...................... 180/79.2 R, 132; 60/433, 434, 423

[56] References Cited
UNITED STATES PATENTS

| | | | |
|---|---|---|---|
| 2,750,742 | 6/1956 | Peterson | 60/433 X |
| 3,083,533 | 4/1963 | Schenkelberger | 180/79.2 R |
| 3,163,253 | 12/1964 | Gibson et al. | 180/79.2 R |
| 3,875,747 | 4/1975 | Briggs | 60/423 |

*Primary Examiner*—M. H. Wood, Jr.
*Assistant Examiner*—John A. Pekar
*Attorney, Agent, or Firm*—John C. Wiessler

[57] ABSTRACT

A power steering system for electric vehicles in which an electric drive motor for the supply pump of a power steering system is controlled by a motor control which is in turn controlled by the steering demand of the operator. The motor and pump are operated only during steering operations and only at the power level required for any steering demand.

12 Claims, 3 Drawing Figures

POWER STEERING SYSTEM

BACKGROUND OF THE INVENTION

The field of art to which the invention pertains includes power steering systems, and more specifically power steering systems for electric vehicles.

Power steering systems for electrically powered industrial trucks and the like are frequently of the open center type; these require circulating hydraulic fluid to be continuously available for power steering demands of the operator. Typically, when the ignition switch is on and the dead man seat switch is activated, as in electric industrial lift trucks, an electric steer motor drives a fixed displacement, gear-type hydraulic pump. So long as these two switches are on, the motor and pump are running even though no steering demands are made. The continuous operation of the steer motor and pump is objectionable because it results in excessive wear of these components, excessive power consumption, which is particularly disadvantageous in battery driven electric vehicles, and the generation of objectionable heat and noise.

SUMMARY

Our invention enables an electric steer motor and pump for electric powered vehicles to operate only in response to steering commands and, essentially, only at the power level required. Control is effected by the generation of a control signal which is a function of the operator's demand for rate of change and total change in the steer angle.

It is a primary object of the invention to provide in a power steering system for electric vehicles an electric steer motor driving a hydraulic steer system pump only in response to the steering demand of the operator and essentially at the power level required to meet that demand.

DESCRIPTION OF THE PREFERRED EMBODIMENT

Figure 1:
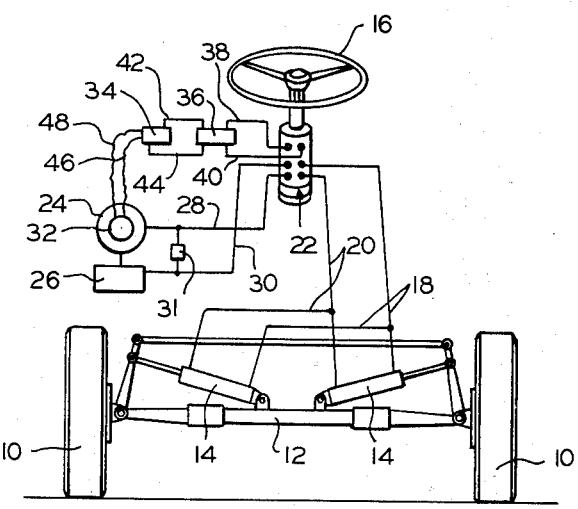
FIG. 1 is a diagrammatic view of a power steering system for electric vehicles.

Referring especially to FIG. 1, a pair of dirigible wheels 10 are mounted on a steer axle 12 having a pair of power steering cylinders 14 connected thereto in a conventional manner and adapted to be actuated to steer the vehicle in accordance with operator input at a steering wheel 16. When wheel 16 is turned it causes a measured volume of pressurized fluid to be transferred to cylinders 14 by way of conduits 18 and 20 and a steering control unit 22 which is activated in one direction or the other by wheel 16.

Control unit 22 is connected to a supply pump 24 and to a reservoir 26 by conduits 28 and 30 (which are connected by a pressure relief valve 31), and to an electric drive motor 32 for the pump by a motor control 34 and a control valve 36. Hydraulic lines 38 and 40 connect unit 22 to control valve 36, and lines 42 and 44 connect controls 34 and 36, motor 32 being connected to control 34 by electric lines 46 and 48.

Figure 2:
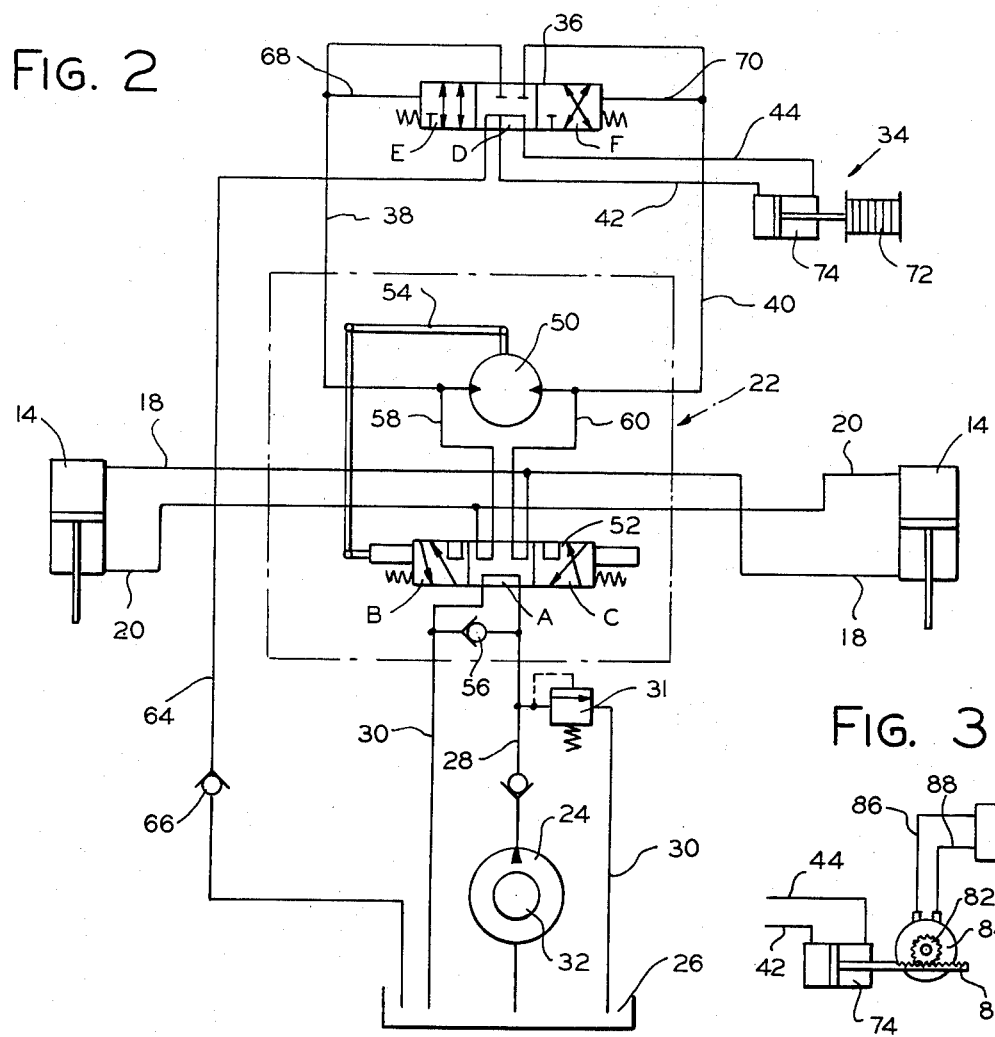
FIG. 2 is a schematic of the power steering system hereof.

Referring now especially to FIG. 2, the steering control unit 22 comprises components as represented schematically inside the broken line area, in which is denoted an orbiting metering pump 50, which is a fixed displacement pump driven in either rotational sense by means of steering wheel 16, a metering spool type valve 52 spring-loaded to an open center position, as shown, and sequenced left or right by a mechanical linkage means 54 according to the rotational direction of metering pump 50, and a check valve 56, metering pump 50 being connectible by conduits 58 and 60 to valve 52 in an infinite number of metering positions thereof between the three operating positions designated as A, B and C. A suitable unit 22 is Char-Lynn Model W, manufactured by the Fluid Power Division of Eaton Corporation of Eden Prairie, Minnesota. The construction and operation of the steering system, exclusive of controls 34 and 36 for motor 32, is conventional and operates as follows: Motor 32 is battery powered to operate pump 24 whenever the starting switch or switches are on and, but for the introduction of the present invention into the steering system, has circulated fluid continuously heretofore through one or another or combinations of sections A, B and C of valve 52. If operation was on section A alone, fluid circulated continuously directly back to reservoir 26 at atmospheric pressure, whereas when operating on section B or C alone pressure fluid is directed to power steering cylinders 14 with return fluid from the non-powered ends of the cylinders returning to the reservoir. To negotiate a turn to the right the operator rotates wheel 16 clockwise thereby mechanically driving metering pump 50 in the right-hand sense which, through mechanical linkage 54, sequences the spool in valve 52 to the right to engage section B fully or meter a selected fluid volume through sections A and B in combination, pump 24 being thereby connected to line 58. Additional clockwise rotation of metering pump 50 meters pressure fluid from line 58 into line 60 and thence to steer cylinders 14 by way of conduits 18 causing the power pistons to effect a steer angle change. Fluid displaced by such steer cylinder action returns to the reservoir by way of lines 20, section B of valve 52 and conduit 30. Whenever the operator stops turning the steering wheel, valve 52 is returned to center section A by linkage 54 and the discharge from pump 24 would again circulate to reservoir 26. The conventional system operates similarly but in a reverse sense when the metering pump 50 is turned counterclockwise to engage operatively section C of valve 52.

Although valve 52 is shown diagrammatically as a three-position valve it is in fact a metering valve which responds sensitively to the direction, speed and angle of rotation of steering wheel 16 through metering pump 50, actuation of the valve being initiated within the first few degrees of rotation of pump 50 through the mechanical linkage 54. Excess output of pump 24 over that required for any particular steering demand at pump 50 therefore flows through valve 52 to the reservoir by way of conduit 30, the precise steering demand being controlled by metering pump 50. In the event any condition should arise tending to cavitate fluid in conduit 28 when steering is initiated at pump 50, turning of the pump 50 would prevent cavitation by pumping fluid through left side conduit 30 and check valve 56 and through valve 52 into line 58 or 60 depending on the direction of rotation of the steering wheel.

Our invention connects valve and motor control components 34 and 36 to each other and to unit 22 for controlling motor 32 as previously noted in general terms. More specifically, valve 36 is a small three position shuttle valve which comprises operating sections D, E and F adapted to be connected to pump 50 and to lines 58 and 60 by conduits 38 and 40, and to control 34 and lines 42 and 44 by a conduit 64 having a check valve 66 therein. Valve 36 is sprung to a centered position on section D, as shown, and is adapted to be fluid pressure actuated to engage section E or F by lines 68 and 70 which connect the valve ends to conduits 38 and 40, respectively. The control 34 includes an adjustable carbon pile resistor 72 and a double-acting fluid actuator 74 connected thereto and to the shuttle valve by lines 42 and 44. The piston rod of actuator 74 operatively bears on the carbon pile, and, as is well known, the electrical resistance of the carbon pile decreases when the head end of actuator 74 is pressurized to compress the carbon pile whereby the motor 32 is controlled by the variable resistance of the carbon pile. The shuttle valve as hydraulically connected senses any pressure difference between lines 58 and 60 which shifts the valve to section E or F, depending on the direction of the pressure difference, thereby controlling through the carbon pile the operation of motor 32 and pump 24 both in duration of operation and power output according to steering requirements, thus metering power to the motor 32 in accordance with the particular steering demand. It will be noted that in the absence of changing steering demands actuator 74 exerts no force on carbon pile 72 so that the electrical resistance is extremely high and virtually no current flows to the motor 32 whereby the pump remains at rest except upon the initiation of a new steering demand.

More particularly, in operation, if the operator rotates steering wheel 16 in a clockwise direction, as shown, metering pump 50 and metering valve 52 are driven in a right-hand sense, as above-described, causing simultaneously the connection of pump 24 to line 58 and an increase in pressure in line 60 which is communicated to shuttle valve 36 by way of conduit 40 and line 70 to actuate said valve leftwardly and communicating conduit 40 with the head end of actuator 74 by way of valve section F and line 42, the rod end of actuator 74 being thereby connected to line 58 by way of conduits 44 and 38 through valve section F (the conduit 64 to the reservoir being closed by valve section F). Thus, the pressure differential across the piston in actuator 74 is equal to the differential between lines 60 and 58, causing compression of the carbon pile 72 to lower the electrical resistance thereof in proportion to the differential pressure and causing the electric motor 32 to drive pump 24 to rotate in such a manner that the pressure and volume output is inversely proportional to the resistance of the carbon pile and is sufficient to supply metering pump 50 so that it meets the operator's steering demand as reflected in the duration and speed of actuation of steer cylinders 14 by way of conduit 18.

A left turn steering demand results in an action similar but in the opposite sense to the above in that valve 52 is actuated leftwardly causing pump 24 to communicate with the opposite ends of cylinders 14 by way of conduit 20, thereby reversing the direction of steer angle. Since the pressure in line 58 will exceed the pressure in line 60, shuttle valve 36 will be actuated rightwardly and, again, the pressure differential will be applied to compress the carbon pile as pressure fluid is directed to the head end of the actuator by way of conduit 38, valve section E and line 42, and return fluid is directed to the reservoir by way of line 44, valve section E, conduit 40, line 60, valve section C, and conduit 30. It will be noted that pressurization of either of lines 58 or 60 by metering pump 50 is always communicated to the head end of actuator 74 so that the carbon pile is compressed for both right and left-hand turns.

When a steering command is terminated, mechanical linkage 11 allows valve 52 to return to a centered position thereby interrupting communication of pump 24 with all hydraulic components downstream of valve 52, any residual pressure downstream of said valve returning to the reservoir by way of line 30. As the differential pressure across actuator 74 dissipates to zero the resultant increasing electrical resistance of carbon pile 72 slows the motor and pump to a stop. At the same time the spring loaded shuttle valve 36 returns to a centered position causing zero pressure differential across the piston of actuator 74, the pressure retained in both ends of the actuator being equal to the pressure setting of low pressure check valve 66.

The components added by our invention to the existing conventional steering system are low in cost and readily available. A feature and advantage of our demand power steering system is that the motor and pump 24 and 32 never change direction of rotation regardless of right or left hand mode of steering. Also, in engineering the system there is no necessity to critically match the output of the pump 24 for exact response because high response may be readily achieved by selecting the pump and motor, and the components of motor control 34, for characteristics which provide a modest excess of pump flow and pressure over operator demand requirements inasmuch as the unit 22 meters any excess to the reservoir.

It will be apparent to persons skilled in the art that a pressure switch, for example, may be added in line 42 or to the discharge side of pump 24 which, at a predetermined pressure, closes an electrical contact to shunt carbon pile 22 out of the circuit so that the motor 32 receives full battery power for generating steer wheel angles at maximum rate against maximum ground resistance.

Figure 3:
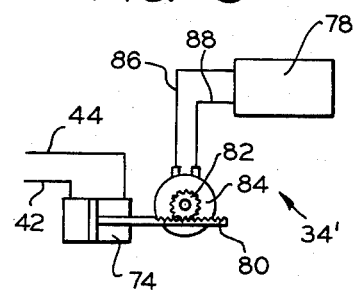
FIG. 3 is a schematic of a portion of FIG. 2 showing a modification thereof.

In FIG. 3 is shown a modification of motor control unit 34 at 34' wherein similar parts have been numbered the same as in FIG. 2. In place of the carbon pile control 72 may be used a solid state DC electric motor controller 78, either of the SCR or power transistor type, together with a variable resistor. As shown, the piston rod is provided with rack gear teeth 80 which mesh with a gear wheel 82 which is keyed to and drives the rotor of variable resistor 84. Any steering demand results in a corresponding displacement of the piston rod, as described above, which will cause an angular movement of the gear wheel which in turn displaces angularly the variable resistor rotor 84. The resulting change in electrical resistance causes an increase or decrease in the chopped power output of the motor controller 78, which is connected to the resistor by lines 86 and 88, in order to control the rpm and power output of the electric drive motor 32. Unit 78 may be of any suitable known solid state DC motor controller, such as either type mentioned above.

Although we have described and illustrated preferred embodiments of our invention, it will be understood by those skilled in the art that modifications may be made in the structure, form, and relative arrangement of parts without necessarily departing from the spirit and scope of the invention. Accordingly, it should be understood that we intend to cover by the appended claims all such modifications which fall within the scope of the invention.

We claim:

1. In a hydraulic steering system for vehicles having an operator control means, dirigible wheel means, hydraulic motor means for actuating the wheel means to steer the vehicle and hydraulic pump means for actuating the motor means to steer the vehicle means responsive to the control means which generates a signal which is a function of the operator's demand for rate of change and total change in the steering angle, and an electric motor and motor control means responsive to said signal for driving said pump means intermittently in response to and as a function of the operator demand for rate of change and total change in the steering angle.

2. A hydraulic steering system as claimed in claim 1 wherein said motor control means includes variable resistor means responsive to said signal.

3. A hydraulic steering system as claimed in claim 2 wherein said variable resistor means is a compressible carbon pile.

4. A hydraulic steering system as claimed in claim 1 wherein said signal is hydraulic pressure.

5. A hydraulic steering system as claimed in claim 4 wherein said motor control means includes means responsive to said hydraulic pressure signal operatively connected to said electric motor for activating and de-activating said motor and for controlling the motor speed.

6. A hydraulic steering system as claimed in claim 5 wherein said motor control means includes a compressible carbon pile responsive to said hydraulic pressure signal.

7. A hydraulic steering system as claimed in claim 5 wherein said motor control means includes a hydraulic actuator responsive in the same direction to said hydraulic pressure signal irrespective of the direction of steering.

8. A hydraulic steering system as claimed in claim 1 wherein said pump means is a fixed displacement pump drivable in one direction only by said electric motor, said operator control means including directional control valve means for steering the vehicle in either direction.

9. A hydraulic steering system as claimed in claim 8 wherein said motor control means is operatively connected to said electric motor for activating and deactivating said motor and for controlling the motor speed.

10. A hydraulic steering system as claimed in claim 1 wherein said operator control means includes a reversible fixed displacement pump means actuated directly by an operator's control member to generate said signal as hydraulic pressure, said motor control means being responsive always in the same direction to said hydraulic pressure signal for controlling said electric motor.

11. A hydraulic steering system as claimed in claim 10 wherein said motor control means includes a compressible carbon pile.

12. A hydraulic steering system as claimed in claim 1 wherein said pump means is driven solely in response to and as a function of said demand for rate of and total change in the steering angle.

* * * * *